Jan. 5, 1965   J. F. IRWIN   3,163,972
BAG CLOSING APPARATUS
Filed Nov. 22, 1963   9 Sheets-Sheet 1

JERE F. IRWIN
INVENTOR.

BY
ATTORNEY

JERE F. IRWIN
INVENTOR.

BY
ATTORNEY

JERE F. IRWIN
INVENTOR.

ATTORNEY

JERE F. IRWIN
INVENTOR.

ATTORNEY

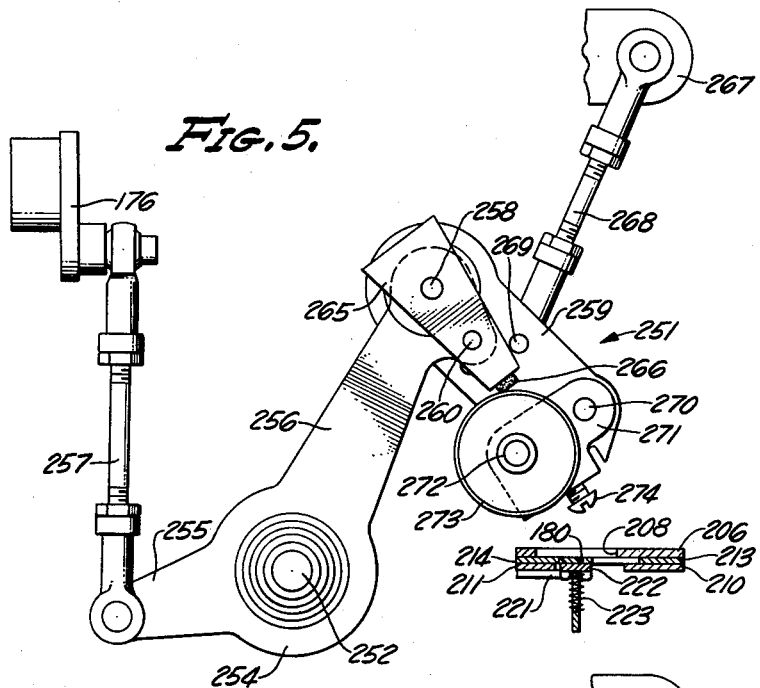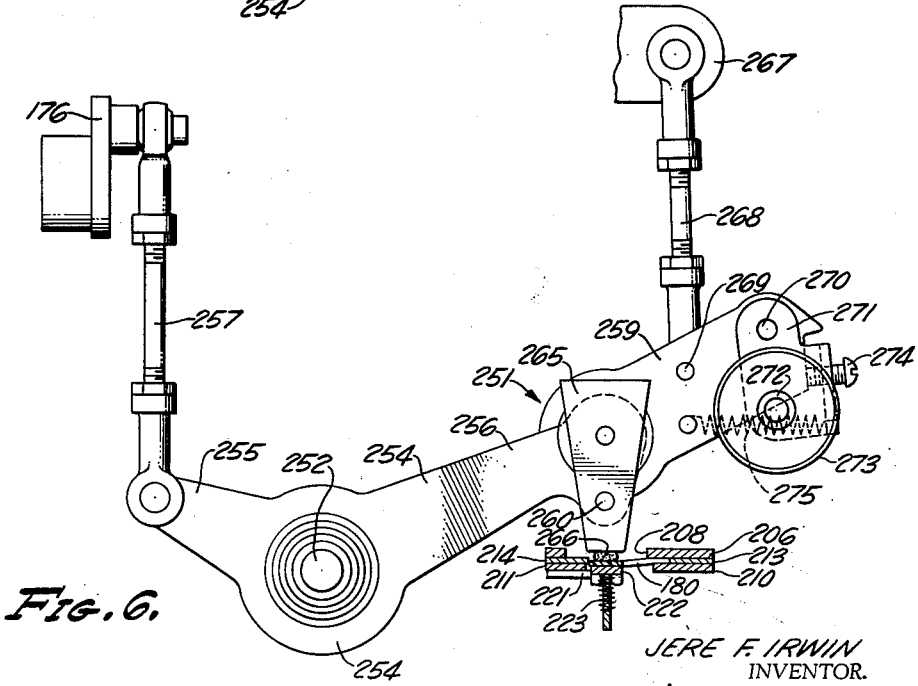

Jan. 5, 1965   J. F. IRWIN   3,163,972
BAG CLOSING APPARATUS
Filed Nov. 22, 1963   9 Sheets-Sheet 6

JERE F. IRWIN
INVENTOR.

BY

ATTORNEY

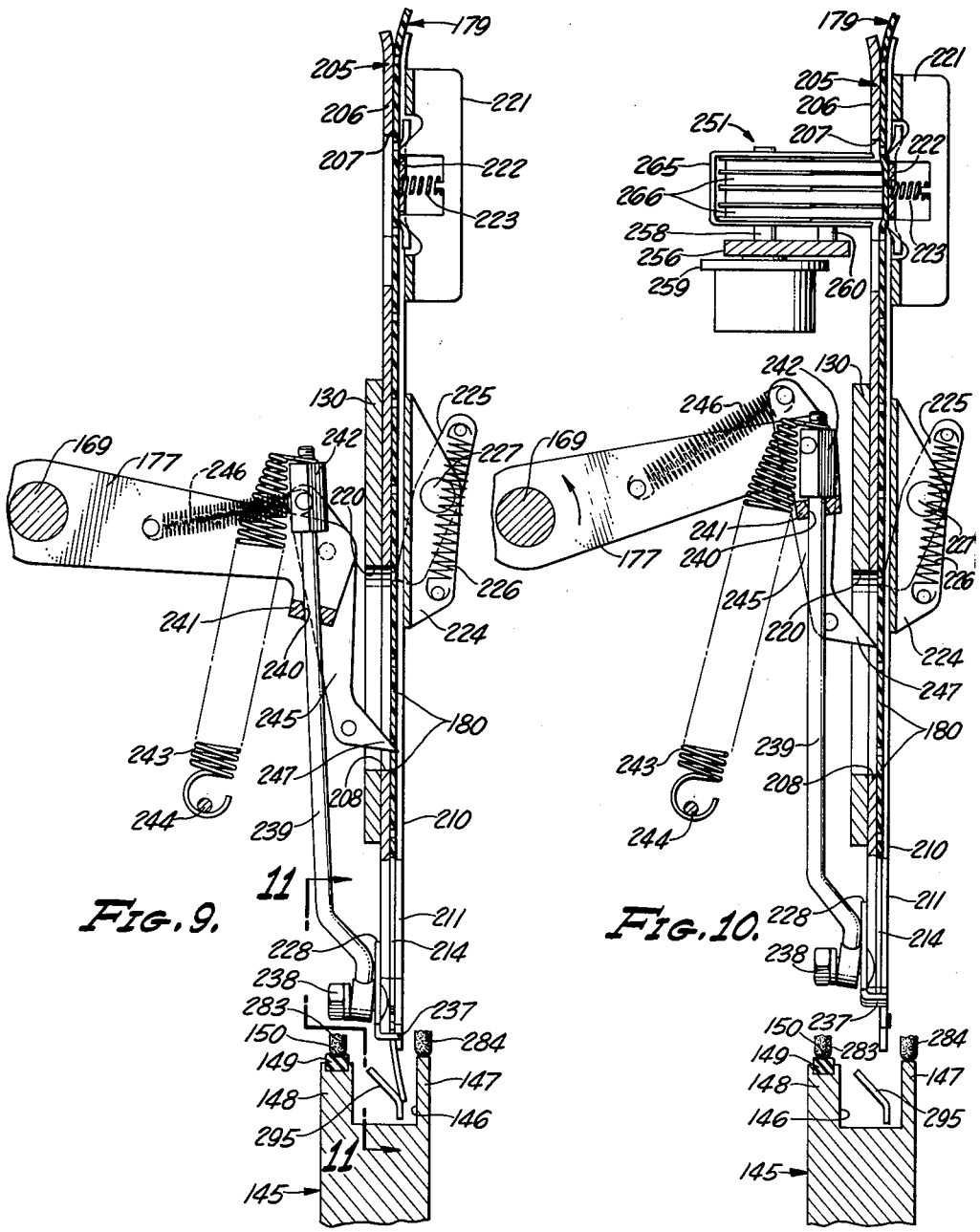

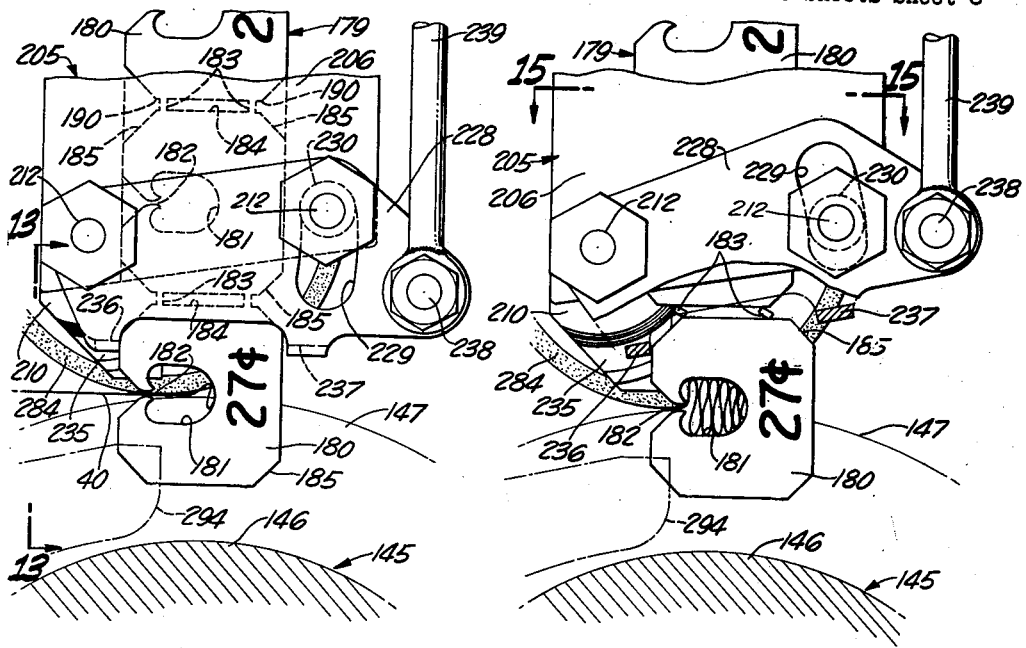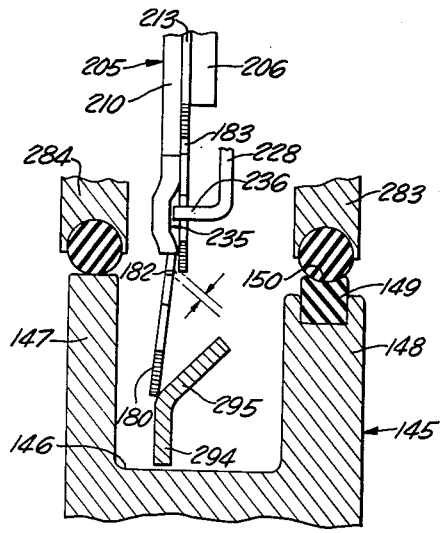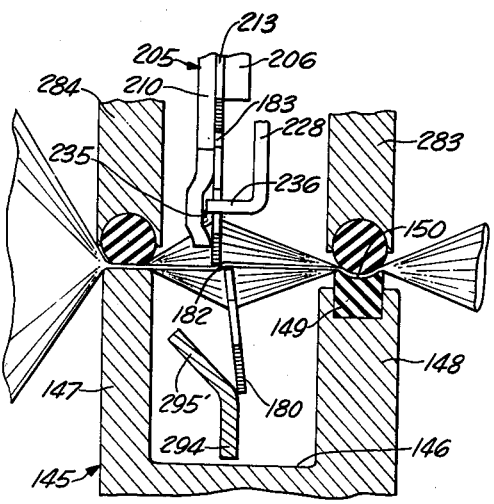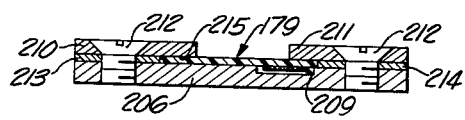

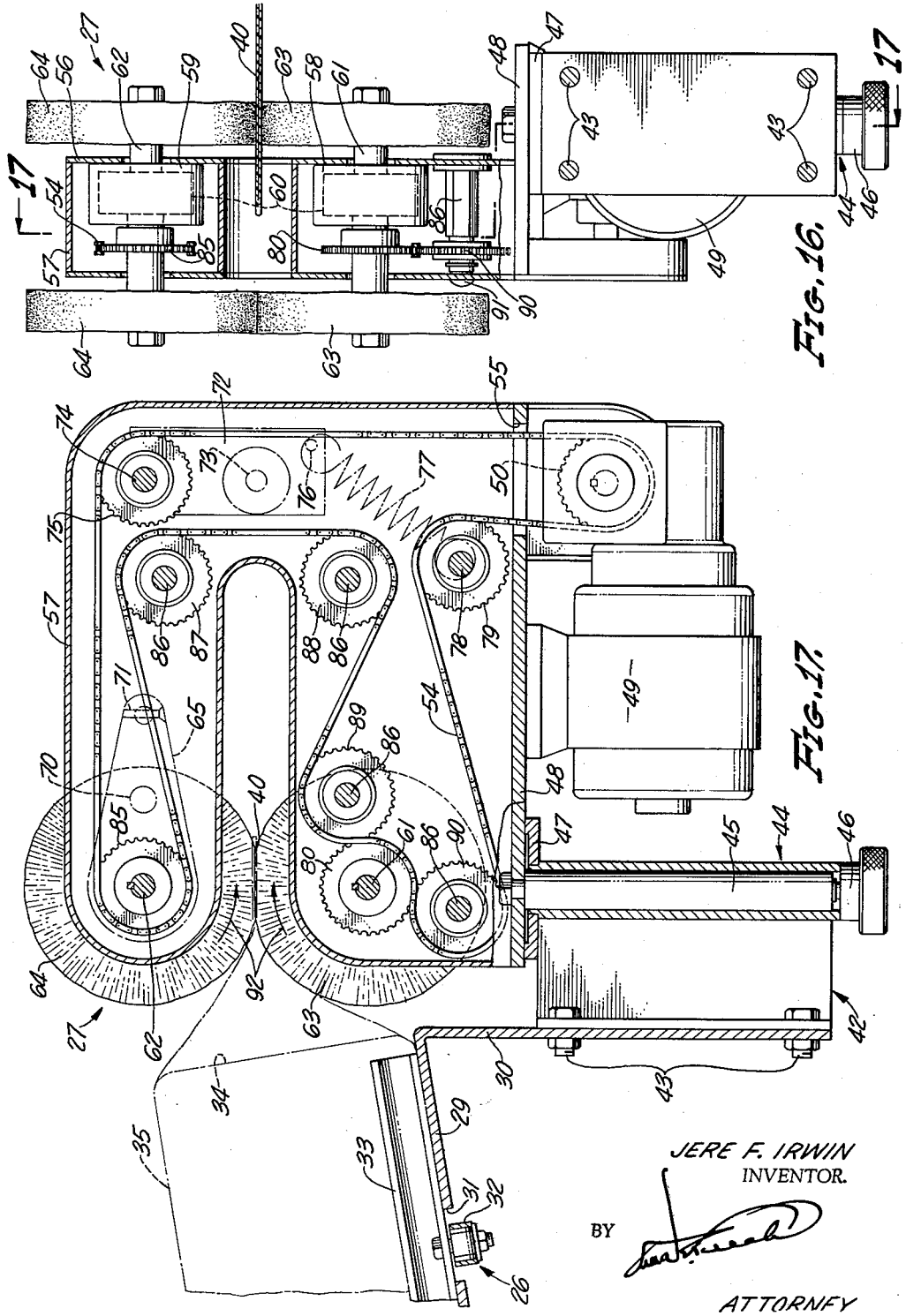

United States Patent Office 3,163,972
Patented Jan. 5, 1965

3,163,972
BAG CLOSING APPARATUS
Jere F. Irwin, Yakima, Wash., assignor to Kwik Lok Corporation, Yakima, Wash., a corporation of Washington
Filed Nov. 22, 1963, Ser. No. 325,683
11 Claims. (Cl. 53—138)

This invention relates to the art of enclosing bread and sundry other products in polyethylene plastic bags and particularly to a machine for applying a closure to the neck of such a bag after the latter has had a loaf of bread or some other product inserted therein.

The present invention is an improvement upon the apparatus disclosed in the copending patent application Serial No. 232,920 filed October 11, 1962, by myself, jointly with Allen D. Paxton and Floyd G. Paxton. Said copending application discloses an experimental model of the invention covered thereby and it is an object of the present invention to provide an improved bag closing apparatus suitable for commercial production.

The prior apparatus above mentioned included a horizontal conveyor having crossbars each of which propelled a bag containing a loaf of bread towards a bag closing machine, the latter having upper and lower pairs of wheels rotating on horizontal axes in tangential relation and between which wheels the flattened neck of each bag was fed. Said machine also included a mechanism for feeding a flat strip of plastic closures downwardly to position the lowermost closure in the path of an oncoming bag neck so that said wheels fed said bag neck into a bag-neck-confining aperture provided in said closure, thereby closing said bag. Immediately upon this being done, said prior machine forced the lowermost closure downwardly relative to the rest of the strip so as to pull apart a pair of webs connecting the lowermost closure to the closure next thereabove, thereby releasing said bag in the closure just applied thereto so that these are carried away on said conveyor.

A defect inherent in the results achieved by said prior machine was that portions of the webs, pulled apart in pulling the lowermost closure from the balance of the strip, projected from opposite edges of each closure thus separated from the strip and these projections were unsightly and sharp thus constituting an imperfection in the product. To overcome this defect, Floyd G. Paxton invented an improved multi-closure strip and method of separating the same into individual closures, which he has covered in a co-pending application, Serial No. 325,665, filed on November 22, 1963, in the U.S. Patent Office. This new multi-closure strip, when applied by said method, results in complete separation of the webs from the closures. To do this commercially however requires a machine to apply said closure strip.

It is therefore another object of the present invention to provide a bag closing machine which is adapted to utilize, feed, apply and separate into individual closures the novel Paxton multi-closure strip aforesaid.

Still another object of the present invention is to improve the mechanism of the aforesaid prior machine for flattening the loose bag neck to prepare the same for introduction between said pairs of tangent wheels to be fed into the lowermost closure in the multi-closure strip.

A further object is to provide a closure applying machine wherein the aforesaid pairs of tangent wheels are improved to render these more effective in performing their function of gathering the flattened neck of each bag into the confining aperture of the lowermost closure of said strip.

Yet another object is to provide a closure applying machine of the type aforesaid wherein the lowermost closure positioned to receive a bag neck is temporarily deflected to enlarge the opening therein leading to the bag closing aperture thereof, thereby facilitating the reception of said bag neck into said aperture.

When operating the machine of the invention with bags which are fairly well filled with a bulky product such as buns, there is a tendency for the bag to pull laterally on the lowermost closure so as to interfere with the separation of the webs from the closures joined thereby, leaving one or both of said webs adhering to one of said closures.

An additional object, therefore, is to provide such a bag closing machine which supports the endmost closure in the strip on the side thereof next to the product contained in the bag being closed so that the pulling of this bag on the closure may not interfere with the proper operation of the closure separating means of the machine.

The aforesaid prior bag closing machine embraced a printing device for printing a price or the like on each individual closure in the multi-closure strip being fed into said machine.

It is also an object of the present invention to provide an improved printing device for accomplishing the same result in a better manner and more particularly at a reduced cost and with superior means of servicing the same as when adjusting or replacing or cleaning type or inking pads.

The manner of accomplishing the foregoing objects as well as further objects and advantages will be made manifest in the following description taken in connection with the accompanying drawings in which FIG. 1 is a diagrammatic plan view of the apparatus of the invention with portions thereof broken away so as to enhance the scale of the portions of the apparatus shown in this view. The operative elements of the invention disclosed in this view are shown as they are disposed at the instant a bag closing cycle of the bag closing head of the invention is triggered by an oncoming bag to start.

FIG. 5 is an enlarged plan view taken on the line 5—5 of FIG. 2 of the printing mechanism of the bag closing head of the invention with the parts thereof shown as at the start of an operating cycle.

FIG. 6 is a view similar to FIG. 5 but illustrates the parts of said printing mechanism as these are disposed at the point in each cycle of operation when said mechanism is applying a printing impression to one of the closures of the multi-closure strip with which said machine is charged.

Figure 3:
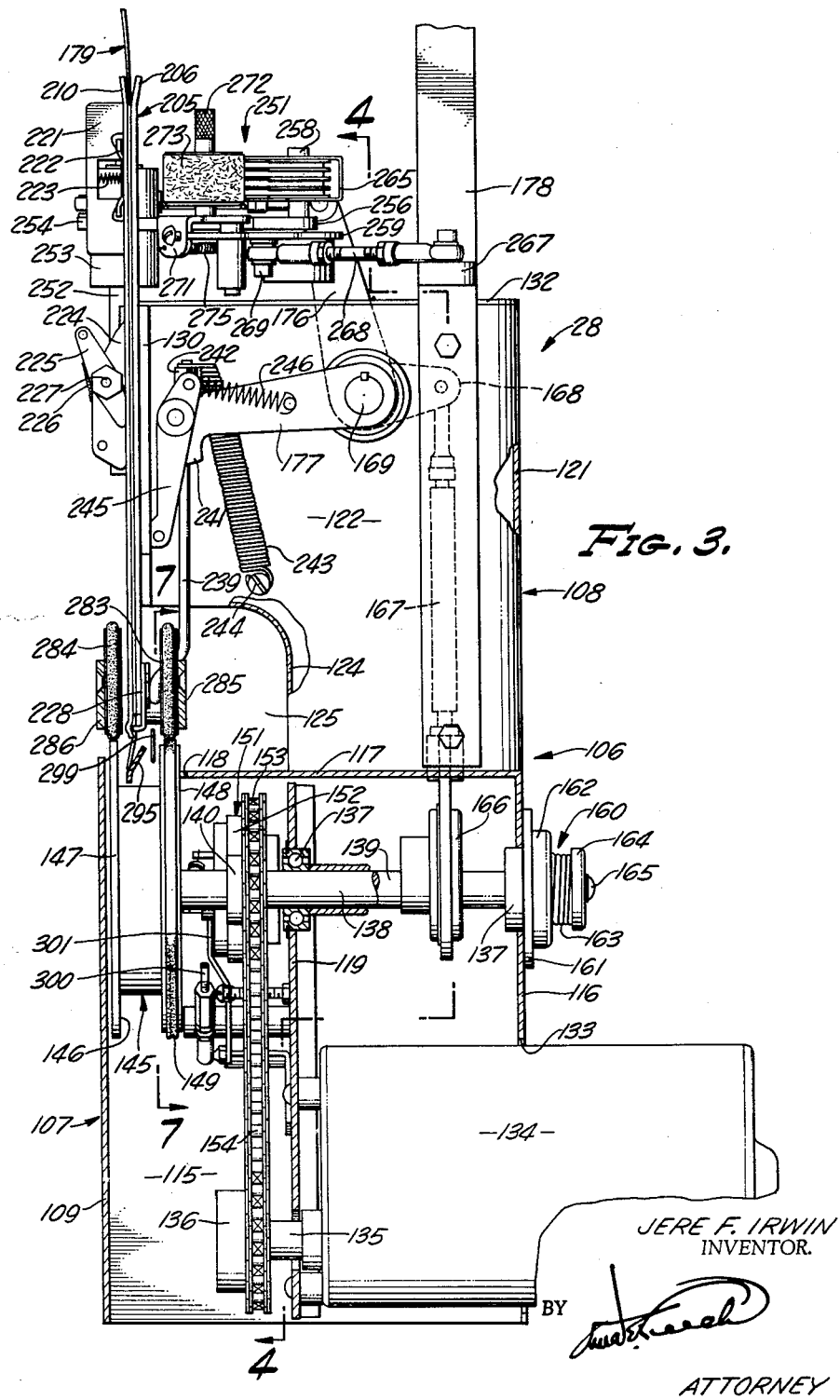
FIG. 3 is a vertical sectional view taken on the line 3—3 of FIG. 2 and also illustrates the parts of the bag closing head of the invention as they are at the start of an operating cycle.
Figure 7:
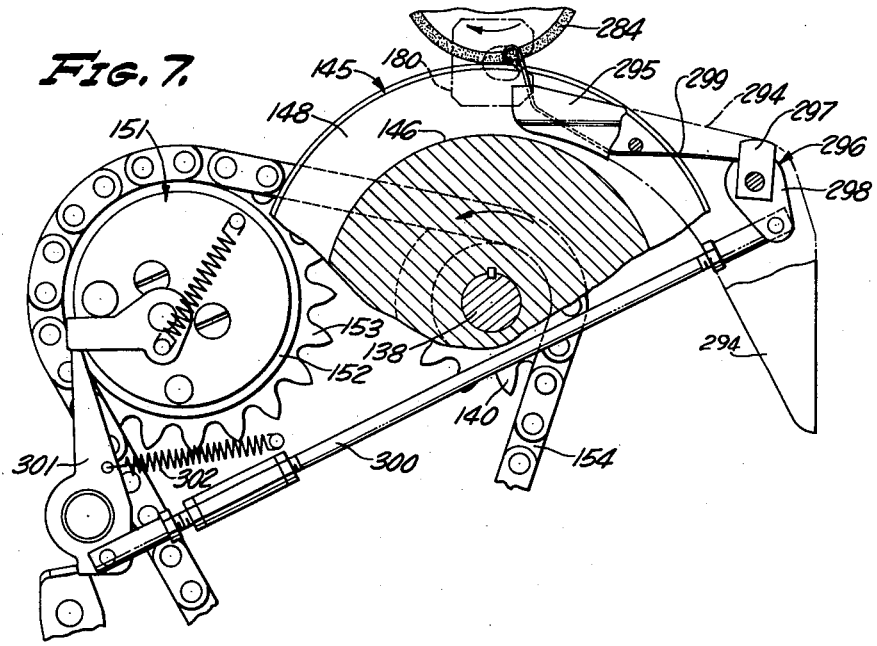

FIG. 7 is an enlarged fragmentary vertical sectional view taken on the line 7—7 of FIG. 3 and illustrates the single cycle drive means for operating the bag closing machine of the invention and the trigger mechanism for initiating a cycle of operation, with the parts thereof shown as they are positioned during intervals between such cycles of operation but with the two pairs of bag feeding wheels rotating which means that the machine is ready to apply a closure to a bag whenever the latter is properly fed into the machine.

Figure 8:
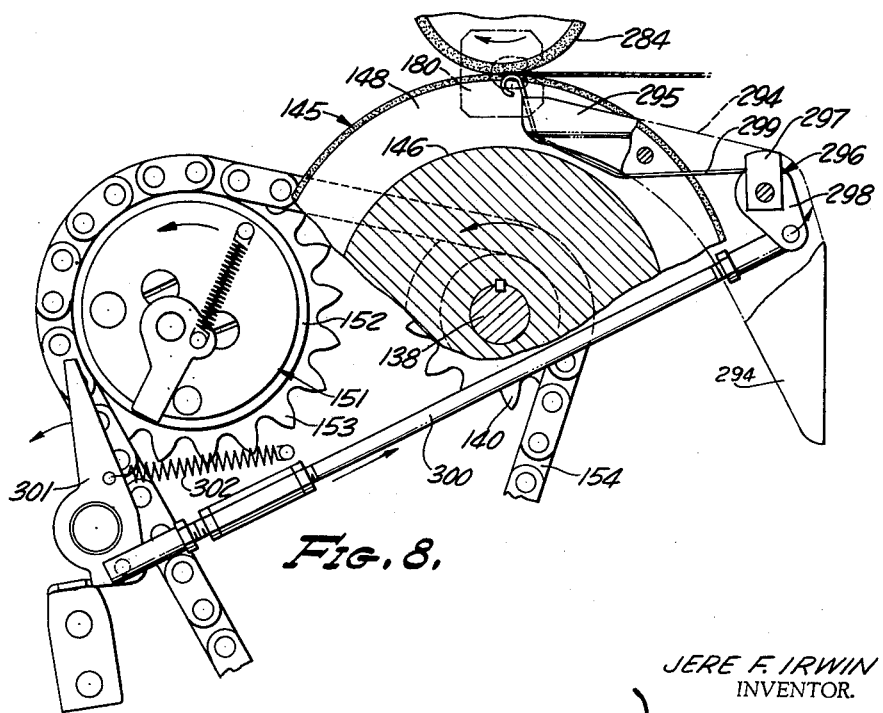

FIG. 8 is a view similar to FIG. 7 and illustrates the parts of the mechanism disclosed therein as these are positioned just after a bag has been fed into said bag closing machine so as to trigger the single cycle power means to initiate a single cycle of operation of said means.

Figure 2:
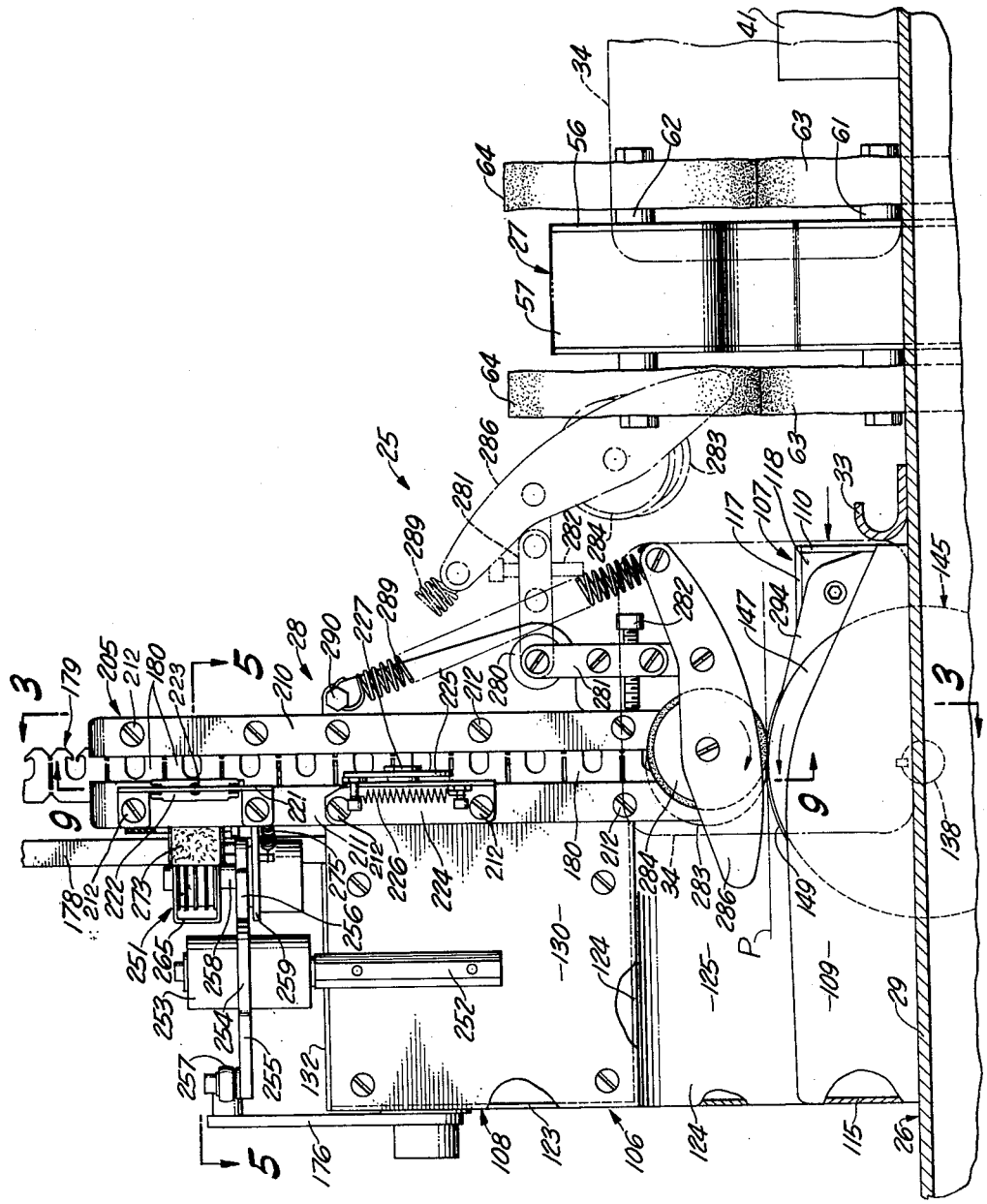
FIG. 2 is a diagrammatic sectional view taken on the line 2—2 of FIG. 1 and showing in side elevation the major operating elements in the bag closing head of the invention with these disposed as at the start of an operating cycle.

FIG. 9 is a fragmentary enlarged vertical sectional view taken on the line 9—9 of FIG. 2 and illustrates the multi-closure strip guide means of the invention and the means for feeding said strip and breaking the lowermost closure from said strip after it has been applied to a bag by translating said closure horizontally parallel with the next closure thereabove in said strip so as to fracture the opposite ends of the webs connecting said closures where said webs join said closures thereby completely separating said webs from said closures and the lowermost closure from said strip. The parts shown in this view are illustrated as they are positioned during intervals between operating cycles of the machine.

FIG. 10 is a view similar to FIG. 9 and shows the parts disclosed therein as these are positioned at a point in a cycle of operation where the endmost closure separating mechanism has just operated to simultaneously fracture opposite ends of both the webs connecting the lowermost closure to the strip so as to separate said closure from said strip without leaving either of said webs or any substantial part thereof still united with the endmost closure or the closure next thereabove in said strip. It is also to be noted that the actuation of said printing mechanism to make a printing impression on one of the closures of said strip concurs with the operation of said closure separating means.

FIG. 11 is an enlarged fragmentary diagrammatic view taken on the line 11—11 of FIG. 9 and illustrates the parts of the closure separating means as these appear before said cycle has reached the point where said means are actuated to separate said closure from the multi-closure strip.

FIG. 12 is a view similar to FIG. 11 and illustrates the parts disclosed therein at a more advanced point in the same cycle of operation which follows the conclusion of the feeding of the bag neck into the bag closing aperture of the endmost closure and the actuation of said closure separating means which immediately follows the complete capturing of said bag neck within said aperture, and illustrates how the pair of relatively long and narrow webs which originally integrally connected the endmost closure to the closure next thereabove have been rotated about their centers about axes normal to the plane of said strip so as to fracture opposite ends of said webs in the areas wherein they were integrally connected to the endmost closure and to the next closure thereabove so as to completely separate said webs from said strip and said endmost closure both from said webs and said strip.

FIG. 13 is an enlarged fragmentary detail view taken on the line 13—13 of FIG. 11 and illustrating how the lower end portion of the endmost closure is deflected by a stationary deflecting member when said closure engages the same so as to increase the size of the opening provided in the edge of said closure for receiving a bag neck fed thereto.

FIG. 14 is a view similar to FIG. 13 but illustrates a modified form of the invention in which said endmost closure deflecting means deflects the lower extremity of said closure in the opposite direction from that shown in FIG. 13, which is to say, it deflects said closure away from the face thereof turned towards the product contained in each bag fed to said machine so as to support said closure against being pulled by said bag and the product therein after said bag has been fed into the closure aperture of said closure so that the pulling of said bag may not deflect the upper portion of said closure out of a vertical plane and thus interfere with the proper functioning of the closure separating means illustrated in FIGS. 11 and 12.

FIG. 15 is a horizontal cross sectional view taken on the line 15—15 of FIG. 12 and illustrates the manner in which the multi-closure strip guide means of the invention confines opposite side edges thereof down to a point just above the lowermost closure in the strip and also shows how protection is afforded of the printing impressions applied to said strip so as to prevent these smearing.

Figure 1:
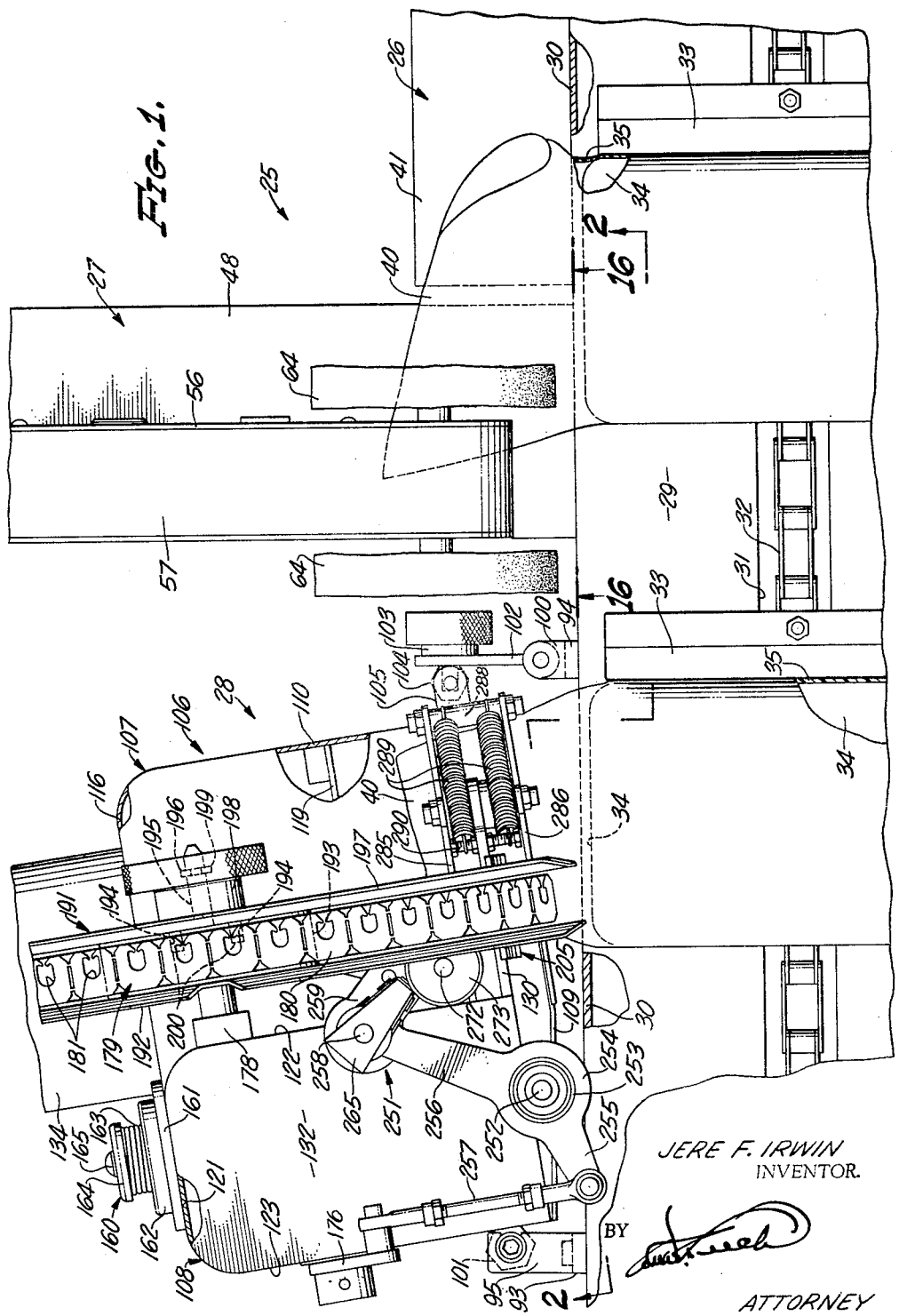

FIG. 16 is a vertical sectional view taken on the line 16—16 of FIG. 1 and illustrating the plastic bag neck flattener of the invention.

FIG. 17 is a vertical sectional view taken on the line 17—17 of FIG. 16 and illustrates the internal construction of said flattener.

Referring specifically to the drawings and particularly FIGS. 1 and 2, the invention may be said to comprise an apparatus 25 for conveying bagged articles along a horizontal path with the articles inserted in plastic bags against the bottom of the bag and with the loose necks of the bags disposed toward one side of the conveying means; flattening said bag necks out in a horizontal plane as they are carried along said conveyor, and, when the bags thus prepared reach a certain point on said conveyor, applying a bag closure to each bag neck so that said closure will confine the product previously placed in said bag. The apparatus 25 thus includes a conveyor 26, a plastic bag neck flattener 27 and an automatic closure applying machine 28 which is popularly known as a bag closing head.

The invention is applicable to bagging a large variety of products but as it is widely used in bagging bread and other bakery products it will be disclosed herein in the bagging of bread. In this specific use of the apparatus 25, the conveyor 26 may comprise a conventional bagged bread conveyor such as is commonly used in the packaging of bread in large commercial bakeries. This conveyor is ordinarily mounted upon a conventional caster supported frame (not shown), this frame supporting a laterally sloping conveyor floor 29, the high edge of which is provided with a side wall 30 extending vertically downward therefrom. Formed longitudinally in the floor 29 is a pair of slots 31 in which upper flights of conventional endless conveyor chains 32 travel so as to continuously propel crossbars 33 in a given direction lengthwise of the conveyor floor, and with said bars extending transversely across said floor. The conveyor 26 includes a guide bar (not shown) which extends lengthwise of the conveyor above the floor 29 and along the lower portion of said floor, said guide bar being adjustable to provide a limit stop for the lower ends of bagged loaves of bread which may be delivered either manually or mechanically onto the conveyor floor 29 so that one such bagged loaf 34 rests on the conveyor floor in advance of each of the crossbars 33 so as to be propelled by said crossbar as the latter advances along said conveyor with said loaf held in parallel relation with the bar by the friction between the loaf and the floor 29 and with the lower end of the loaf (contained in the bottom of the bag 35) resting by gravity against the aforesaid longitudinal guide bar. This guide bar is of course adjusted in accordance with the length of said loaf, so that the unoccupied end portion 40 of bag 35 extends outwardly over the high side edge of the conveyor floor 29 as shown in FIGS. 1 and 17.

Conveyor 26 is independently powered so as to be continuously driven under a control by which the speed of travel of the bagged loaves of bread 34 along the conveyor floor 29 is controllable to suit the capacity of the rest of the apparatus 25 to close said bags. The plastic bag neck flattener 27 and the bag closing head 28 are secured to the side wall 30 of the conveyor in tandem relation as shown in FIG. 1 and said side wall also has provided thereon a sheet metal rail 41 (FIGS. 1 and 2) the upper surface of which is preferably horizontal and located at a level above the adjacent high edge of the conveyor floor 29 for a purpose which will be made clear hereinafter.

The bag neck flattener 27 has a mounting clamp 42 which is secured by bolts 43 to conveyor side wall 30 just beyond the rail 41 of conveyor 26. Clamp 42 includes a mounting hinge 44 with a hollow pin 45 containing a clamp screw 46 and an inwardly relieved disc 47 provided on the upper end of said hinge which supports the flattener base plate 48 so that the entire flattener 27 may be adjustably set in various angular relations, about the axis of said clamp screw relative to said conveyor. Supported on the plate 48 and extending downwardly therefrom is a geared motor 49 having a drive sprocket 50 about which is trained an endless chain 54 which extends upwardly therefrom through a slot 55 formed in said plate.

A flattener frame 56 is rigidly secured on said base plate and extends vertically upwardly therefrom as shown in FIGS. 16 and 17, said frame having the shape of a U laid upon its side on said base plate with the opening in said U disposed close to and facing the upper edge of conveyor floor 29. Mounted on the flattener frame 56 and corresponding in vertical outline thereto, is a flattener frame cover 57 which conforms to the U-shaped outline of said frame and is secured to the latter so as to cover the mechanism of the flattener. Mounted on frame 56 within said cover are lower and upper brush bearing housings 58 and 59 these housings containing bearings 60 in which journal brush shafts 61 and 62 on opposite ends of which are fixed respectively pairs of brushes 63 and 64, these brushes being cylindrical in outline and the upper pair of brushes being adjustable vertically to bring the peripheries of the two pairs of brushes into proper tangential relation as shown in FIG 17.

To effect this vertical adjustment of brushes 64 the bearing housing 59 on which these are supported is mounted on one end of a rockable lever 65 which is secured by an intermediate pivot 70 to the flattener frame 56, with the opposite end of said lever adjustably secured to said frame by an adjusting screw 71. A chain tension arm 72 is also adjustably mounted by a pivot screw 73, one end of said arm carrying a shaft 74 on which a tension sprocket 75 is mounted while the other end of said arm has a pin 76 which is connected by a contractile spring 77 with a shiftably mounted shaft 78 carrying an idler sprocket 79. Fixed on shafts 61 and 62 are sprockets 80 and 85 respectively. Four sprocket and cover mounting bars 86 are fixed on the flattener frame 56 these bars providing stationary axles for idle sprockets 87, 88, 89 and 90 and have tapped holes at their extremities for receiving screws 91 by which the cover 57 is mounted on the frame 56. All of the sprockets above described, which are housed within the cover 57 are rotatably mounted in the same vertical plane as drive sprocket 50 on motor 49 and the endless chain 54 extending upwardly through hole 55 in plate 48 is trained around said sprockets as shown in FIG. 17 so that brushes 63 and 64 are rotated at the same rates of speed in the directions shown by arrows 92 in FIG. 17. As shown in FIG. 2, the horizontal plane of tangency in which the brushes 63 and 64 meet is located only a short distance above the upper face of sheet metal rail 41 provided on the conveyor 26. Thus open end portions 40 of plastic bags 35 which overlie rail 41 as they are pushed along conveyor 26 by crossbars 33, are fed between the first lower brush 63 and upper brush 64 and then subsequently between the second pair of these brushes so that the combined action of these rotating pairs of brushes is to pull the open end portions 40 of the bags 35 away from the loaf 34 contained in each such bag so that end portions 40 of the bags are flattened in a horizontal plane located about mid-way between upper and lower limits of the adjacent ends of said loaves as said bag necks travel out of contact with the bag neck flattener 27.

While the flattener 27 is shown in the drawings as set on clamp 42 so that the axes of rotation of brushes 63 and 64 are parallel with the conveyor 26, the flattener may readily be shifted to a different angular position in which said brush converges towards the conveyor in the direction of its travel. This adjustability is useful in adapting the bag neck flattener 27 to handling bags of different shapes and sizes which are loaded with different kinds of products. The vertical adjustability of the upper shaft 62 and the pair of brushes 64 mounted thereon permits the degree of pressure exerted on the bag necks by brushes 63 and 64 to be varied so that this pressure is sufficient to flatten the bag neck but not enough to pull the loaded bag out of its position of repose on the conveyor 26.

As shown in the plan view of FIG. 1, the bag closing head 28 of the apparatus of the invention is mounted on the conveyor side wall 30 in tandem relation with the bag neck flattener 27 so that bags carried on the conveyor and passing out of contact with the bag neck flattener 27 are fed immediately into the bag closing head 28.

To accomplish the mounting of bag closing head 28 on conveyor side wall 30, the latter has fixed thereto a shallow U-shaped mounting bracket 93 and a clamp arm pivot bracket 94. These brackets have upper and lower vertically spaced apertured arms 95 and 100 respectively. Releasably pivoted between the arms 95 of bracket 93 is a vertical mounting shaft 101 the body of which is hexagonal in cross section and is secured to closing head 28. Swingably mounted between the apertured arms 100 of bracket 94 is a horizontally slotted tongue 102. A clamp screw 103 having a large knurled head extends through the slot in tongue 102 and into a tapped horizontal hole provided in a vertical hexagonal shaft 104 which is pivotally mounted at its upper and lower ends in a pivot bracket 105, which is secured to closing head 28.

The bag closing head 28 includes a housing 106 including a base section 107 and an inverted L-shaped tower section 108. The housing base 107 is open at the bottom, is closed at the front by removable plate 109 and includes integrally united near side wall 110, far side wall 115, back wall 116 and horizontal upper deck 117. At the near upper front corner the housing base section is cut away to provide an opening 118 through which certain elements of the mechanism mounted within said base section may extend upwardly for reasons which will be made clear hereinafter. Secured at its opposite side edges to side walls 110 and 115 parallel with back wall 116 and approximately equally dividing the space within said base section 107 is an intermediate wall 119.

The tower housing section 108 is integrally united with deck 117 and rises vertically from the far back corner of said deck, the latter having a relatively large hole 120 formed within the area covered by said tower section which communicates between the two sections of the housing 106.

The tower housing section 108 includes integrally united back wall 121, near side wall 122, far side wall 123 and a step wall 124 which carves out a passageway 125 which is open to the front and at both side ends for a purpose to be made clear hereinafter. Above the step wall 124, the tower housing section 108 is closed by a strip closure guide mounting plate 130 supported on corner bars 131 which are secured by suitable screws to both the plate 130 and near and far side walls 122 and 123 of the tower section 108. The top of tower section 108 is closed by a removable cover plate 132.

Formed in the back wall 116 of base housing section 107 near the lower end of said wall in a circular opening 133 through which extends a cylindrical electric motor 134, the inner end of which is mounted on intermediate wall 119 with output shaft 135 of said motor extending through a suitable aperture formed in said wall and having mounted thereon, in front of said wall a drive sprocket 136. The motor 134 embodies a reduction gear therein whereby shaft 135 rotates at about 120 r.p.m. when said motor is energized. Journalling in suitable bearings 137 mounted in back wall 116 and intermediate wall 119 and approximately on the same horizontal level are shafts 138 and 139. Fixed on shaft 138 is a sprocket 140 while mounted on the front end of this shaft is a spool shaped bag neck feeding rotor 145 having a deep annular channel 146 formed peripherally therein which lies between a pair of bag neck feeding wheels comprising a front wheel 147 and a rear wheel 148 which are coaxial and approximately equal in peripheral diameter the outer periphery of front wheel 147 however being smooth metal while that of rear wheel 148 is formed by a rubber tire 149 having an annular peripheral groove 150 formed therein.

Shaft 139 has mounted thereon, in front of intermediate wall 119, a single revolution clutch 151 having a shell 152 which rotates freely when said clutch is not actuated, this shell having a sprocket 153 provided thereon which is disposed in the same vertical plane with sprockets 136 and 140, the three sprockets being connected together by an endless chain 154. An idler sprocket 155 is spring biased to eliminate slack in said chain.

Mounted on an opposite end portion of shaft 139 which extends outwardly through the back wall 116 is a retarding brake 160 which includes a brake plate 161 which is secured to the back face of back wall 116, a disc 162 which is longitudinally slidable on and keyed to shaft 139, an expansion coiled spring 163 which is interposed between said disc and a washer 164 which is secured to the end of shaft 139 by a screw 165 so as to constantly press said friction disc 162 against said brake plate. The retarding brake 160 functions to constantly retard rotation of shaft 139 thereby assisting substantially in halting rotation of shaft 139 at the conclusion of a single revolution thereof as the clutch 151 is automatically disconnected from the clutch bell 152.

Also fixed on shaft 139 just beneath the hole 120 in deck 117 is an eccentric bearing 166 which connects to the lower end of an adjustable connecting rod 167, the latter extending upwardly through said hole and being pivotally connected at its upper end to a short arm 168 mounted on a horizontal shaft 169 which journals in bearings 170 and 175 mounted in side walls 122 and 123 of tower housing section 108. Fixed at opposite ends of shaft 169 just outside said side walls, is an arm 176 which normally extends approximately vertically from said shaft and an arm 177 which normally extends approximately horizontally forwardly from said shaft.

Fixed in a vertical position on near side wall 122 near the rear edge of said wall is a bar 178 which extends a substantial distance above the upper end of tower housing section 108 to provide a standard for supporting a coil of multiple closure strip 179 said coil normally containing approximately 2500 closures, when first placed in the machine, and being freely rotatable on the upper end of standard 178 so that such strip may be drawn downwardly from the periphery of said coil as it is needed in the operation of the bag closing head 28.

The multiple closure strip 179 is preferably formed of polystyrene which is a brittle but bendable plastic material. This is first extruded in the form of a wide sheet which is then slit into ribbons about ⅞ of an inch wide and these ribbons are individually run through a high speed die-cutting machine which produces the finished multiple closure strip 179. This strip comprises a series of bag closures 180 each of which has formed therein inwardly from a side edge of the closure (which also constitutes a side edge of said strip) a bag confining aperture or mouth 181 which is large enough to confine a cross section of the material of the neck of a bag when the same is introduced into said aperture through a narrow opening 182 formed in said side edge of said closure. In the die-forming of said closure strip, each adjacent pair of closures 180 consecutively formed in said strip are connected together by a pair of relatively narrow webs 183 at opposite ends of a transverse slot 184 formed by said webs and the juxtaposed end edges of said pair of closures. It is also to be noted that inner portions 190 of notches 185 formed in side edges of the closure strip symmetrically with said slots to form beveled corners on the closures 180, constitute outward extensions of the parallel edges of slots 184 so that each web 183 forms four right angles with the straight transverse juxtaposed end edges of the two closures 180 which it joins.

As shown in FIG. 1 the coil of closure strip 179 is supported on the upper end of vertical bar 178 by a nonrotating reel 191 including a triple armed stationary back wall 192, a hub drum 193 which is also stationary and has diametrically opposed recesses 194 provided therein, said drum being provided with an axial stationary center pin 195 having an annular groove 196. The reel 191 also includes a triple armed stationary front wall 197 which is mounted on a hub 198 having a knurled flange and centrally apertured to fit over said center pin said hub also having a detent 199 which engages said annular groove to hold said front wall in place on said pin when it is forced thereon. Hub 198 also has short studs 200 which fit into recesses 194 to prevent said front reel wall 197 from rotating on said center pin when installed thereon.

Whenever it is necessary to furnish the bag closing head 28 with a fresh supply of bag closures 180, the knurled flange on hub 198 is merely seized and pulled outwardly which removes the entire triple-arm stationary front wall 197 of said reel. A fresh coil of the closure strip 179 is then applied over the hub drum 193, the front wall 197 of the reel is replaced as shown in FIG. 1 and upon the proper feeding of said closure strip into the bag closing head 28, the latter is ready to continue operation.

Referring now to FIGS. 2, 3 and 9 to 15 inclusive, it is to be noted that closure strip 179 when drawn downwardly from the reel 191, is fed into the upper end of a closure strip guide 205. This guide includes a back plate 206 having upper and lower holes 207 and 208 provided therein and also having a shallow groove 209 formed in the front face thereof coextensive with the length of said plate, the purpose of which will be made clear hereinafter, and front side plates 210 and 211 which are secured by twelve screws 212 to the side edges of back plate 206 so as to capture spacer strips 213 and 214 between said guide plates so as to form a guideway 215 for said closure strip as shown in FIG. 15 which securely confines the strip as it is fed along said guide to the station at the lower end of said guide where each of the closures in said strip is applied in turn to the neck of a plastic bag.

Six of the screws 212 not only assist in the assembly of the strip guide 205 but are received rearwardly in tapped holes provided in plate 130 so as to rigidly mount said guide on said plate. Upper hole 207 of plate 206 is located above the upper edge of mounting plate 130 and the latter plate has a hole 220 which coincides in position and outline with the lower hole 208 of the back plate 206.

Secured by two of the screws 212 to the left side plate 211 opposite the upper hole 207 in said back plate is a bracket 221 which is formed as shown in FIGS. 9 and 10 to trap a pressure plate 222 in contact with the closure strip 179 where this is fed downwardly opposite upper hole 207, said plate being biased by expansion spring 223 against the front face of said closure strip to yieldably support the same during a sprinting operation being performed on the back face of said strip directly opposite said pressure plate.

Secured to the left side plate 211 by two other of the screws 212 just below the upper edge of guide mounting plate 130, is a bracket 224 on which a detent arm 225 is pivotally mounted and spring biased so as to gently press a pointed lower end of said arm into each of the slots 184 in the closure strip 179 as the latter is fed downwardly past said arm. Said arm is provided with a spring 226 and a pivot 227 so positioned that when it is desired to disengage said detent arm from engagement with said closure strip, it is merely necessary to swing said arm to shift said spring over the center of said pivot in which event the detent arm is temperarily held out of engagement with said strip.

Mounted on the inside of said strip guide 205 by the lowermost pair of screws 212 is a web-breaking rocker 228, the near one of said screws providing a pivot for said rocker and the far one of said screws extending through a slot 229 in said rocker which allows said rocker to rock vertically within the limits provided by said slot upon a sleeve 230 fitting within said slot and anchored in place by said screw. The lower end of front side plate 210, which is adjacent the screw 212 about which said rocker pivots, extends downwardly close to a horizontal plane P (FIG. 2) which is tangent with the upturned peripheries of bag neck feeding wheels 147 and 148. The near edge of the lower portion of side plate 210 is beveled at an angle of about 45° for a reason to be made clear hereinafter. Formed in the back surface of said side plate 210 below the screw 212 on which rocker 228 is pivoted and concentric with the axis of said screw, is an arcuate channel 235 for receiving a web breaking lug 236 which is bent forwardly from the lower edge of a near portion of said rocker so that said lug extends across the vertical plane of the closure strip 179, as this is fed down the strip guide 205 and spaced a slight distance away from the near edge of said strip when said rocker is rocked downwardly to the limits of slot 229 as shown in FIG. 11.

Bent forwardly from the lower edge of a far portion of web-breaking rocker 228 is a web protecting lug 237 which normally is disposed in close relation with the far edge of closure strip 179 so as to hold the lowermost closure of the strip in vertical alignment with the balance thereof up until the moment when it is desired to separate the lowermost closure 180 from the strip 179.

Pivotally connected by a bolt 238 to the far end of web-breaking rocker 228 is a rocker actuating link 239, the upper end of which extends through a loosely fitting hole 240 formed in a lug 241 bent inwardly from the front end of the closure feeding and web-breaking actuator arm 177. Link 239 is threaded at its upper end to receive an adjustable stop nut 242 which is spaced a substantial distance above the lug 241 at the start of a cycle of operation by the bag closing head 28. The link 239 is constantly biased downwardly by a tension spring 243 one end of which hooks over the upper end of said link and the lower end of which hooks around a pin 244 fixed in the near side wall 122 of the tower housing section 108.

Pivotally mounted on a horizontal axis on the outer end of arm 177 is a closure strip feed finger 245 which is biased by a spring 246 connected to said finger and to said arm to extend the pointed lower end 247 of said finger through the holes 208 and 220 and against the closure strip 179 which is exposed to view through said holes. The finger 245 lies in a vertical plane which causes the lower end thereof to engage the strip 179 opposite the slots 184 therein so that each downward movement of said finger causes this to engage one of these slots and shift the strip 179 downwardly in the guideway 215 the length of a single closure 180. When the finger 245 moves upwardly over the inner surface of the closure strip 179, the pointed lower end of detent arm 225 rests in one of the slots 184 of the closure strip thereby preventing friction between the finger 245 and the strip from shifting the latter upwardly so as to prevent the proper feeling downwardly of the strip when the finger 245 returns downward.

Mounted on the top of tower section 108 of the housing 106 is a closure printer 251. This includes a hexagonal mounting shaft 252 which is secured vertically to the front face of closure strip guide mounting plate 130 and carries spaced ball bearings (not shown) confined within the hub 253 of a printer lever 254 having arms 255 and 256. The arm 255 is linked by adjustable connecting rod 257 to the upper end of arm 176 which is mounted on shaft 169. Fixed in the end of arm 256 is a vertical pin 258 which extends both upwardly and downwardly from said arm, the downward portion thereof pivotally connecting the end of said arm with an inker plate 259. Also provided in arm 256 and spaced from the pin 258 is an upwardly extending pin 260 and an adjustable rubber band type head 265 is provided with holes which receive pins 258 and 260 so as to removably position said head on arm 256 with said head in either of two relatively inverted positions. The head 265 has four separate rubber bands of type faces 266 and any desired selection may be made by adjusting these bands to present the desired type faces 266 at the front end of the head 265 as shown in FIGS. 5 and 6 for making a printing impression upon one of the closures 180 in the strip 179. Fixed on vertical bar 178 is a horizontal lug 267 the outer end of which is pivotally connected by an adjustable connecting rod 268 to a vertical pin 269 provided in inker plate 259.

Pivotally mounted by pin 270 on the inker plate 259 is an ink roller mount 271 having a vertical pin 272 on which a cylindrical ink roller 273 is mounted so as to be freely rotatable. The mount 271 has a limit screw 274 by adjusting which exactly the right amount of contact may be had between ink roller 273 and type faces 266 when the printer 251 is operated. The roller mount 271 is biased by a spring 275 towards the type head 265 so as to yieldably apply the ink roller to the type faces during each inking operation.

The operation of the closure printer 251 is clearly shown in FIGS. 5 and 6, FIG. 5 showing this in its normal inoperative position during intervals between bag closing cycles of operation, while FIG. 6 shows the printer at the moment that the type faces 266 are swung into printing relation with the back face of one of the bag closures 180 which is exposed through the upper hole 207 of the closure strip guide 205. Upon return to normal position as shown in FIG. 5 the type faces 266 exposed at the end of type head 265 come into rolling contact with the ink applying surface of the ink roller 273 and pass over this surface as shown in FIG. 5 so that upon starting another cycle of operation a fresh application of ink from the roller 273 to the type faces 266 takes place immediately prior to the application of said type faces to a closure 180. Assurance is thus given that so long as the ink roller 273 is kept adequately saturated with ink, and a proper adjustment is made of the limit screw 274, the type faces will always be supplied with the proper amount of ink to do a good printing job in each operating cycle.

The closure strip guide mounting plate 130 extends to the right as shown in FIG. 2 beyond the closure strip guide 205 and provides a bearing 280 on which the forked upper end of a toggle link 281 is pivotally mounted. An adjustment screw 282 is provided in said link to bear against the mounting plate 130 and closure strip guide 205 to provide an adjustment of the positions assumed by two rubber tired small diameter wheels 283 and 284 which are pivotally mounted in staggered relation upon inside faces of a pair of plates 285 and 286 which in turn are connected by a pivot 287 to the lower end of forked link 281 and joined together at their outer ends by a spacer 288 to which two springs 289 are connected with the upper end of said springs hooked over a pin 290 mounted at the upper end of guide mounting plate 130 so as to spring bias the wheels 283 and 284 into constant tangential rolling engagement with the upward disposed peripheries of lower power driven wheels 147 and 148. The full-line position in which wheels 283 and 284 are shown in FIG. 2 is their normal operating position but whenever it is desired to clear the space immediately surrounding the lower end of the closure strip 179 to clean out any closures or bags that might have become jammed in that area, the plates 285 and 286 may be readily pulled outwardly by stretching the springs 289, whereupon these springs will hold said wheels in the broken line position for the same shown in FIG. 2 until the operator is ready to start the machine operating again in which event he merely pulls forwardly and downwardly on the springs 289 and plates 285 and 286 so as to tuck the wheels 283 and 284 upwardly into rolling contact with the power driven wheels embodied in bag neck feeding rotor 145.

Figure 4:
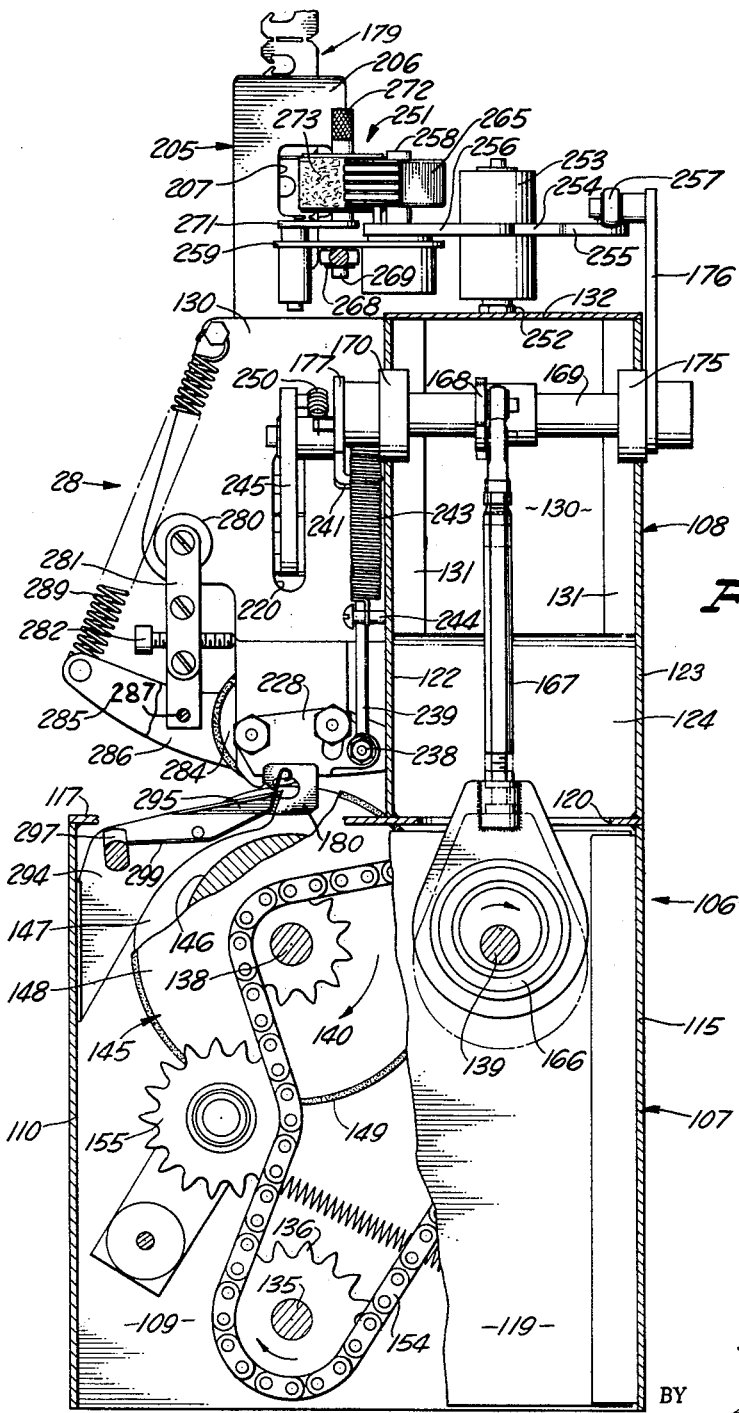
FIG. 4 is a vertical sectional view taken on the line 4—4 of FIG. 3 and also shows the parts as at the start of an operating cycle.

The means for controlling the operation of the bag closing head 28 are illustrated in FIGS. 7 and 8. Here we see that a closure deflecting plate 294 is fixed to the inner surface of the near side wall 110 (FIG. 4) of the base housing section 107, and extends horizontally and upwardly into the annular peripheral channel 146 formed in the bag neck feeding rotor 145 so that the extremity 295 of this plate, which is canted from vertical, underlies a corner portion of the lowermost closure 180 in strip 179 as said strip is fed downwardly in the operation of the bag closing head so that said lower closure is deflected to substantially increase the width of the opening 182 therein and thus enhance the proper feeding of a bag neck through said opening into the closing aperture or mouth 181 of said closure.

In FIG. 13, the extremity 295 of deflecting plate 294 is shown canted so as to deflect the lower near corner of the lowermost closure 180 outwardly relative to said closing head, which is to say, towards the product contained in the bag being closed by said closing head. Where these bags are filled with a bulky product such as buns, there is a tendency for the bag to exert quite a pull on the lowermost closure, the instant that the bag has escaped from between the rubber tired upper wheels 283 and 284 and the front and rear wheels 147 and 148 of the bag neck feeding rotor 145. Where these conditions prevail, it has been found advantageous to reverse the inclination of the extremity 295 of deflecting plate 294 as this is shown in FIG. 14 so that this plate will resist the pull of the bag on the lowermost closure 180 and thus assure proper functioning of the means provided for separating this from the balance of the closure strip 179.

Pivotally mounted on the deflecting plate 294 as shown in FIGS. 7 and 8 is a rocker 296 including arms 297 and 298 the first of which has mounted thereon a wire trigger 299 which extends horizontally into the annular peripheral channel 146 of the bag feeding rotor 145 and then upwardly out of said channel to a position opposite and just inside of a lower portion of the rubber tired wheel 284 so as to be intercepted by a bag neck fed between said wheel and the rear wheel 148 of the bag neck feeding rotor 145 so that said wire trigger 299 is carried horizontally with said bag neck thereby rocking the rocker 296 and swinging the arm 298 which is connected by an adjustable connecting rod 300 to a rotary clutch operating dog 301 which normally prevents clutch 151 from rotating shaft 139 but when so actuated, initiates a single revolution of the shaft 139 which produces a single bag closing cycle of operation of the bag closing head 28. The dog 301 is constantly biased by a spring 302 to return into the position in which it is shown in FIG. 7 in which it halts the rotation of shaft 139 at the conclusion of a single revolution thereof, and this spring is sufficiently powerful to return the rocker 296 to its inoperative position as shown in FIG. 7 as soon as the bag neck which had just initiated a single cycle of operation of the bag closing head has had a closure 180 applied thereto and has been discharged from between the bag neck feeding wheels of the invention.

The various functions of the mechanism of the bag closing head 28 are performed in the following order during a single bag closing operation. It is desirable that some time elapse after the wire trigger 299 has been actuated by a bag neck engaging the same as shown in FIG. 8 to allow time for said bag neck to have been completely gathered into the bag closing aperture of the lowermost closure before that closure is separated from the balance of the closure strip 179. To accomplish this, each cycle of operation ends with the closure feed actuating arm 177 in its lowermost position so that approximately the initial one-third of each cycle of operation has expired before the arm 177 has been lifted far enough to engage the adjustable stop nut 242 on the upper end of the link 239 so as to lift the latter and swing the web-breaking rocker 228 upwardly thus forcing the web breaking lug 236 against the near edge of the lowermost closure 180 and fracturing the webs 183 in the four areas of their attachment at their lower and upper ends with the lowermost closure 180 and the closure 180 immediately thereabove.

As the printer 251 must finish its printing operation on the closure strip 179 while this is stationary in the closure strip guide 205, the printer is timed to complete its operation in the early part aforesaid of the cycle of operation so as to have withdrawn the type faces 266 out of contact with the closure strip 179 before the closure feed finger 245 moves downwardly into engagement with one of the slots 184 of the strip 179 which, of course, immediately starts the downward movement of the strip a distance equal to the length of one closure.

Termination of each cycle of operation thus returns all operating parts of the bag closing head 28 to the same condition as when that operating cycle started and in complete readiness for the immediate starting of another operating cycle.

The disclosure herein of only a single preferred embodiment of the present invention is for illustrative purposes only and it is to be understood that various changes and modifications may be made in this without departing from the spirit of the invention or the scope of the appended claims.

I claim:

1. In a machine for receiving sheet plastic bag closures united end-to-end in the form of a strip, by narrow frangible webs formed integrally therewith, each closure having in one edge thereof a narrow opening connecting inwardly with a bag-neck-confining mouth, and applying said closures to neck portions of partially filled flexible plastic bags to close the latter, the combination of: means for receiving said closure strip with the endmost closure of the strip located with the edge opening thereof aligned with a given plane and facing in a given direction; means for feeding a flattened neck of a bag towards said edge opening with said flattened neck lying in said plane, to progressively deliver an entire transverse section of said bag neck through said edge opening of said endmost closure and into the bag-neck-confining mouth of the latter; and means operable upon the conclusion of said closure applying operation for laterally shifting said endmost closure approximately parallel with the next closure in said strip, and in the plane of said strip, to simultaneously fracture the connection between said closures and the opposite ends of the webs uniting said closures so as to substantially completely separate said webs from said cloures and said closures from each other, said endmost closure thereby being free to leave said machine with the bag to which it has been applied, said means then advancing the balance of said strip to place said next endmost closure in the position vacated by the first mentioned endmost closure.

2. A machine as recited in claim 1 wherein said openings are in a side edge of said strip and said given plane is approximately normal to said strip and the lateral shifting of said endmost closure is in the direction of movement of said flattened bag neck in said plane.

3. A machine as recited in claim 2 wherein the means for separating the endmost closure from said strip and subsequently feeding said strip the length of one closure, function in timed relation with the delivery of said flattened bag neck to said bag neck feeding means.

4. A machine as recited in claim 3 wherein said flattened bag neck feeding means comprises two pairs of tangentially rotating pairs of wheels located respectively on opposite sides of said given plane and approximately tangent therewith, for gripping and feeding said bag neck through said endmost closure opening, and wherein said strip receiving means comprises a strip guide extending parallel with and between the wheels of one of said pairs of wheels and terminating close to said given plane so that opposite side edges of the next to the endmost closure are surrounded and supported by said guide while the side edge of said endmost closure having said opening is exposed beyond said guide for receiving said flattened bag neck in said opening; a rocker plate pivotally mounted on said guide near said terminal end thereof between said pair of wheels, said plate having a lug extending therefrom across a side edge of said endmost closure; a trigger actuated in timed relation with a flattened bag neck being fed between said pairs of wheels; and a single cycle power means, a cycle of which is initiated by actuation of said trigger to cause said power means to rock said rocker plate to apply said lug to the adjacent side edge of said endmost closure to fracture opposite ends of the webs connecting said closure to said strip, to return said plate to its original position and to feed said strip the length of a single closure as aforesaid.

5. A combination as recited in claim 4 wherein a printing device is provided on said machine which is actuated by said power means during an initial portion of each cycle thereof to print an ink impression on one of the closures of said strip located a substantial distance from the foremost closure thereof, this taking place prior to that portion of said cycle in which said strip is advanced the length of a closure.

6. A flexible bag closing machine comprising: means for conveying a succession of bags to a closing station; a pair of wheels positioned at said station, to receive and advance the bag necks between them, said wheels being in such close peripheral proximity as to flatten the bag material; means functioning, in timed relation with the advancing of bag necks by said wheels, for feeding a succession of preformed closures, an edge of each of which is provided with a bag neck receiving opening, to a location at said station where the flattened bag material passes from between said wheels with the opening of the foremost closure positioned to receive and gather the flattened material; deflecting means in the path of each closure as it arrives at said location so as to be engaged by said closure, whereby said means deflects a portion of said closure to temporarily enlarge the closure opening and thereby facilitate the delivery of said bag material into said opening; and means for releasing the closures and associated bags from said station.

7. A bag closing machine as recited in claim 6 wherein said bags contain bread or some other product, when advanced towards said closing station, and wherein said closure deflecting means deflects an advanced portion of each closure, arriving at the location aforesaid for applying said closure to a bag, in a direction opposite to that in which said bag product lies with respect to said closure, whereby tension applied by said product to said closure tending to pull said closure towards said product is resisted by said deflecting means and said tension has the effect of increasing the temporary enlargement of the bag material receiving opening of said closure.

8. A bag closing machine as recited in claim 7 wherein said closures are fed to said machine integrally united in strip form by relatively narrow frangible closure connecting webs; guide means for confining said strip edges while said strip is being so fed but leaving the foremost closure free, when advanced to the aforesaid location for applying the same to a bag, to be shifted laterally in the plane of said strip, relative to the balance of said strip; and means functioning in timed relation with the feeding of said bag material into the opening of said endmost closure to shift said endmost closure laterally as aforesaid thereby fracturing said strip at opposite ends of the webs connecting said endmost closure with said strip and completely freeing said endmost closure from said webs and said webs from said strip.

9. A bag closing machine as recited in claim 8 wherein said closure strip is fed to said location with said strip, considered in cross section, disposed in a plane parallel with the direction of travel of said bag into said machine, said strip, considered lengthwise, however, being normal to said direction of travel of said bag, the openings of said closures being provided in edges thereof provided by a side edge of said strip.

10. In a machine for receiving sheet plastic bag closures united end-to-end in the form of a strip by narrow frangible webs formed integrally therewith, each closure having in an edge thereof, formed by a side edge of said strip, a norrow opening enlarged inwardly to form a bag-neck-confining mouth, and applying said closures to neck portions of flexible bags, with each bag containing a loaf of bread or other product, so as to close said bags and package said product, the combination of: guide means for receiving said closure strip for feeding the same to a position with the endmost closure located with the side edge opening thereof aligned with a given plane and facing in a given direction; means for feeding a flattened neck of a bag towards said edge opening with said flattened neck lying in said plane, to progressively deliver an entire transverse section of said bag neck through said edge opening of said endmost closure and into the bag-neck-confining mouth of the latter; and means functioning in timed relation with the feeding of said bag neck into said opening of said endmost closure to shift said closure laterally relative to the balance of said strip, thereby simultaneously fracturing the webs between said endmost closure and the closure next thereto at the points of connection between said closures and said webs.

11. A machine as recited in claim 10 wherein said guide means confine side edges of the closure next to the endmost closure but leaves the latter free to be shifted laterally for separating the same from said strip as aforesaid; and means disposed between said endmost closure and said product in a bag being closed by said closure, for supporting said closure against being displaced by the pull of said bag on said closure and thereby facilitate the proper performance of said closure separating means.

References Cited in the file of this patent
UNITED STATES PATENTS

| | | |
|---|---|---|
| 3,021,654 | Harris | Feb. 20, 1962 |
| 3,061,983 | Irwin | Nov. 6, 1962 |
| 3,099,116 | Platt et al. | July 30, 1963 |